(12) United States Patent
Pasieka

(10) Patent No.: US 6,671,803 B1
(45) Date of Patent: Dec. 30, 2003

(54) METHOD AND SYSTEM FOR CONSUMER ELECTRONIC DEVICE CERTIFICATE MANAGEMENT

(75) Inventor: Michael S. Pasieka, Thornwood, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/320,808

(22) Filed: May 27, 1999

Related U.S. Application Data
(60) Provisional application No. 60/103,280, filed on Oct. 6, 1998.

(51) Int. Cl.$^7$ .................................................. H04L 9/00
(52) U.S. Cl. ........................................ 713/156; 380/201
(58) Field of Search ................................. 380/200–203; 713/156, 193, 176; 705/56, 57

(56) References Cited

U.S. PATENT DOCUMENTS

| | | | | |
|---|---|---|---|---|
| 5,568,552 A | * | 10/1996 | Davis .......................... | 705/59 |
| 5,949,877 A | * | 9/1999 | Traw et al. .................. | 713/171 |
| 6,226,618 B1 | * | 5/2001 | Downs et al. ................ | 705/1 |
| 6,363,488 B1 | * | 3/2002 | Ginter et al. ............... | 713/201 |
| 6,389,403 B1 | * | 5/2002 | Dorak, Jr. ..................... | 705/52 |
| 6,389,538 B1 | * | 5/2002 | Gruse et al. ................ | 713/194 |
| 6,418,421 B1 | * | 7/2002 | Hurtado et al. .............. | 705/54 |
| 6,542,610 B2 | * | 4/2003 | Traw et al. ................. | 380/262 |
| 2001/0039613 A1 | * | 11/2001 | Ohishi ........................ | 713/156 |
| 2002/0035690 A1 | * | 3/2002 | Nakano ....................... | 713/171 |

FOREIGN PATENT DOCUMENTS

| | | | | |
|---|---|---|---|---|
| EP | 0831648 A2 | | 3/1998 | .......... H04N/5/913 |
| WO | WO9737492 | | 10/1997 | .......... H04N/5/913 |
| WO | WO9907126 | | 2/1999 | .......... H04L/29/06 |
| WO | WO 00/21241 | * | 4/2000 | ............. H04L/9/32 |

* cited by examiner

*Primary Examiner*—Ayaz Sheikh
*Assistant Examiner*—Christopher Revak

(57) ABSTRACT

A system for providing security, such as copy protection, between a source device and a sink device, in accordance with the present invention, includes a first device including a list of certificates, each certificate of the list including a signature for identifying manufacturers of second devices. A second device is included for connecting to the first device, the second device including a list of certificates each certificate including a signature for identifying manufacturers of the first devices. At least one of the first device and the second device includes an adaptor for adapting a respective certificate list to provide entry of a new signature for identifying a new manufacturer of one of the first devices and the second devices.

19 Claims, 6 Drawing Sheets

METHOD AND SYSTEM FOR CONSUMER ELECTRONIC DEVICE CERTIFICATE MANAGEMENT

This application claims the benefit of Provisional Application Ser. No. 60/103,280 filed Oct. 6, 1998.

BACKGROUND

1. Technical Field

This disclosure relates to security in using electronic devices and more particularly, to a method and system for managing certificates including public keys for providing copy protection.

2. Description of the Related Art

Copy protection of material which can be retrieved on consumer electronic devices is a growing concern. In one example, the content provider industry including broadcasters and movie producers desire to limit the number of pirated copies of content material. Several methods have been put forth to protect the content as it passes between consumer devices. For example, the content as it passes between a set top box and a digital television must be protected. Otherwise, a perfect digital copy of the content could be made and distributed in violation of copy protection laws.

To date, most if not all schemes for protecting the content material include at least one piece of information which is kept secret. The secret and exactly where the secret is stored is immaterial. In one kno method, the secret is a unique cryptographic key in every device which can act as a source of content. The key is used by the source device in the creation of digital signatures. The digital signature is used to verify the secure transport of information between the source and sink devices.

Once the signature arrives at the sink device, a verification process must ensue to determine if the information was tampered with in transit or an illegal source device is attempting to fool the sink device. For the sink device to verify the digital signature, the public key of the manufacturer of the sink device is used to verify a certificate containing the public key of the manufacturer of the source device. The public key of the manufacturer of the source device is used to validate a certificate containing the public key of the source device. Finally the public key of source device is used to validate the signature.

The present invention facilities the availability of certificates including various public keys. The present invention solves the problem of making sure a certificate including the public key of a new manufacturer of either a source or sink device is available on the sink device.

SUMMARY OF THE INVENTION

A system for providing copy protection between a source device and a sink device, in accordance with the present invention, includes a first device including a list of certificates. Each certificate of the list includes a signature for identifying manufacturers of second devices. A second device is included for coupling to the first device. The second device includes a list of certificates, and each certificate includes a signature for identifying manufacturers of the first devices. At least one of the first device and the second device includes means for adapting its respective certificate list to provide entry of a new signature for identifying a new manufacturer of one of the first devices and the second devices.

In alternate embodiments, the first device may include one of a pass-through device and a playback device. The second device may include one of a record device and a presentation device. The signatures may each include a public key designated for each manufacturer. The means for adapting may include means for transmitting and storing a new certificate between devices. The first device and the second device are preferably connected by a bus.

Another system for providing copy protection between a source device and a sink device, in accordance with the present invention, includes a source device including a list of certificates. Each certificate of the list provides a signature for a manufacturer of sink devices, i.e., the signature for verifying sink devices. A sink device is included for connecting to the source device. The sink device includes a list of certificates corresponding to source device manufacturers. The source and/or the sink device have a certificate omitted from the list of certificates of the other of the sink device and/or the source device. Means for adapting the source and/or the sink device to receive a new certificate are included wherein the new certificate is transmitted to the source/sink device to be added to the list of certificates thereby identifying the sink/source device to the source/sink device.

In alternate embodiments, the sink/source device may include a certificate list corresponding to manufactures of source/sink devices, and the source/sink device has a certificate omitted from the list of certificates of the sink/source device. The sink/source device may further include means for adapting the sink/source device to receive a new certificate. The new certificate is transmitted to the sink/source device to be added to the list of certificates thereby identifying the source/sink device to the sink/source device. The source device may include one of a pass-through device and a playback device, and the sink device may include one of a record device and a presentation device. The signatures may each include a public key designated for each manufacturer. The devices are preferably connected by a bus.

A method for copy protecting content transferred between a source device and a sink device according to the present invention includes the step of transmitting identifying information between the source device and the sink device. Verifying the source device and the sink device is preferably performed by determining if the source device and the sink device include the identifying information transmitted from the other of the source device and the sink device. If the step of verifying fails, new identifying information is checked against certification information in which the certification information is provided for one of a new source device and a new sink device. The new source device or the new sink device (or both) include new identifying information. The steps of transmitting and storing the new identifying information between the source device and the sink device are preferably included to provide a new certificate for enabling data exchanges between the source device and the sink device.

In other methods, the steps of transmitting and storing the new identifying information may include verifying the new identifying information with a predetermined certification source. The predetermined certification source may include a private key. The identifying information and the new identifying information may include public keys corresponding to manufacturers of the source devices and the sink devices.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention relates to security, for example copy protection, for content transmitted from a source device to a sink devices. More particularly, the present invention relates to a method and system for managing certificates including public key information used in protecting the transmission of content between a content source device and a content sink device connected via a two-way digital interface/bus. The invention provides a system and method for introducing new devices of both source or sink types whereby all past devices may successfully securely interact with the new device. To be able to securely interact, the device must be able to verify a digital signature of a certificate transmitted by the other device.

The present invention provides a method for ensuring the availability of certificates for use in creating a secure connection between two devices. One use of a secure connection between devices is in the area of copy protection. The certificates include public keys for ensuring authentication of a sink device. The invention provides a system and method for introducing new devices into a copy protected system which utilizes predetermined manufacturer's codes or keys.

In the following description, all certificates will illustratively comply with the standard set forth in International Telecommunication Union Telecommunication Standardization Sector (ITU-T) X.509 and the identical document International Standards Organization (ISO/IEC) International Standard 9594-8; however, other certificate definitions may be employed. The X.509 certificate definition specifies the following fields: version, serial number, signature, issuer, period of validity, subject's public key, issuer unique identifier, subject unique identifier and extensions.

In this invention, each certificate includes a subject and public key of either a particular manufacturer or a unique source or sink device. As per the specification referenced above, each certificate is digitally signed by the issuer of the certificate. Verification of the certificate needs the public key of the issuer of the certificate. The subject and public key subject extracted from a verified certificate may be used to verify the digital signature of a certificate issued by the subject. Given that a public key and subject are known and a set of certificates exist, a series (or chain) of verifications can be preformed verifying the data included in a series of certificates.

An abbreviated form of notation for a certificate is adopted here for illustrative purposes. The certificate fields of interest in the current content are subject, subject's public key, issuer and signature. This can be expressed as Cert(Pub(<subject>), Sig(<issuer>). As an example, Cert(Pub(source device[man[A]]), Sig(man[A])) is a certificate where the subject is a source device manufactured by manufacturer A and the issuer is manufacturer A. The Pub(man[A]) is used to verify the signature of this certificate. For another example, Cert(Pub(man[B]), Sig(man[C])) is a certificate where the subject is manufacturer B and the issuer is manufacturer C. The Pub(man[C]) is used to verify the signature of this certificate.

This invention provides that each source device have a private key and a certificate including the corresponding public key issued by the manufacturer of the device, Cert(Pub(source device[man[A]]), Sig(man[A]). Additionally, each source device needs to have a set of certificates including the public key of the manufacturer of the device and signed by the set of all currently known manufactures of sink devices, Cert(Pub(man[A]), Sig(man[i])) where i ranges over all currently known manufactures of sink devices.

Likewise, the present invention provides that each sink device has a unique device private key and the public key of the manufacturer of the device, Pub(man[B]). Additionally, each sink device has a set of certificates including the public key of the manufacturer of the device and signed by the set of all currently known manufactures of source devices, Cert(Pub(man[A]), Sig(man[j])) where j ranges over all currently known manufactures of source devices.

When a source device signs a certificate and sends the same to a sink device, the sink must in all cases be able to verify the signature of the certificate. Given the above requirements and assuming that the source device was manufactured by manufacturer A and the sink device was manufactured by manufacturer B, the sink can verify the certificate by the following example chain of verification.

Using the public key of the manufacturer of the sink device, Pub(man[B]), the certificate is verified including the public key of the manufacturer of the source issued by the manufacture of the sink, Cert(Pub(man[A]), Sig(man[B])). Extracting the public key of the manufacturer of the source device, Pub(man[A]), the certificate is verified for the public key of the source device issued by the manufacturer of the source device, Cert(Pub(source device), Sig(man[A]). Finally, extracting the public key of the source device, Pub(source device), a certificate including data issued by the source device is verified. The chain of verifications which the sink device preforms to verify a certificate issued by the source device is presented in Table 1.

TABLE 1

Chain of Verifications

| Public Key | Certificate Verified by the Public Key |
|---|---|
| Pub(man[B]) | Cert(Pub(man[A]), Sig(man[B])) |
| Pub(man[A]) | Cert(Pub(source device), Sig(man[A])) |
| Pub(source device) | Cert(data, Sig(source device)) |

When a new manufacturer, C, produces a new source device, the previously manufactured sink devices will not have a certificate to be able to complete the verification chain, specifically, Cert(Pub(man[A]). Sig(man[C]) will be missing. But, the new source device will have this in its set of certificates. This is then presented to the sink device for verification and use.

Likewise, when a new manufacturer, D, produces a new sink device, the previously manufactured source devices will not have a certificate to be able to complete the verification chain, but the new sink device will have this in its set of certificates. This is then presented to the source device for verification and use.

Figure 1:
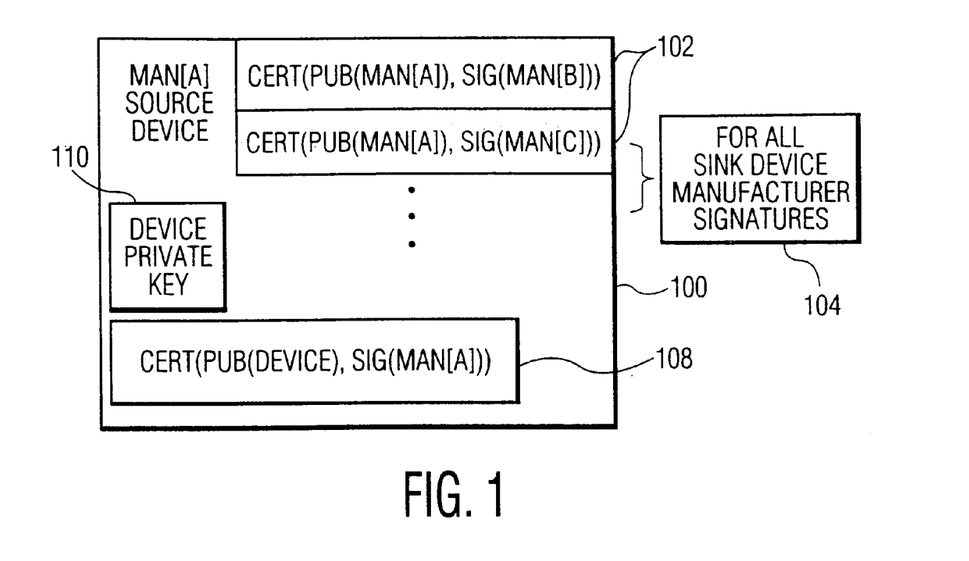
FIG. 1 is a block diagram of a source device showing information stored thereon for copy protection in accordance with the present invention.

Referring now in specific detail to the drawings in which like reference numerals identify similar or identical elements throughout the several views, and initially to FIG. 1, a source device 100 stores a number of certificates 102. A source device includes a device for writing content onto a bus, and a sink device includes a device for reading content from the bus. Source devices may include a pass-through and/or a playback device, such as a set top box or a VCR. Sink devices may include a record and/or presentation device, such as a tape or a televison. Other source and sink devices may be used and may include radios, tape players, CDs, computers, etc. The number of certificates 102 is equal to the number of sink manufacturers 104 known at the time of the manufacture of source device 100. Each stored certificate 102 includes a public key of the source manufacturer, Pub(man[A]). Each certificate 102 is issued by a different manufacturer of sink devices, Sig(man[i]) where i 0000 represents a sink manufacturer's designation. Thus, the list of certificates on a source device 100 is of the form Cert(Pub(man[A]), Sig(man[i])), as shown in FIG. 1, where Sig(man[i]) is different in each certificate 102. As described above, another certificate 108 is stored on source device 100. Certificate 108 includes a public key of the source device 100 issued by the manufacturer of the source device 100, Cert(Pub(Device), Sig(man[A])). Source device 100 further includes a unique private key 110 which is used to as an individual key for that specific device, device 100 in this example, as described above.

Figure 2:
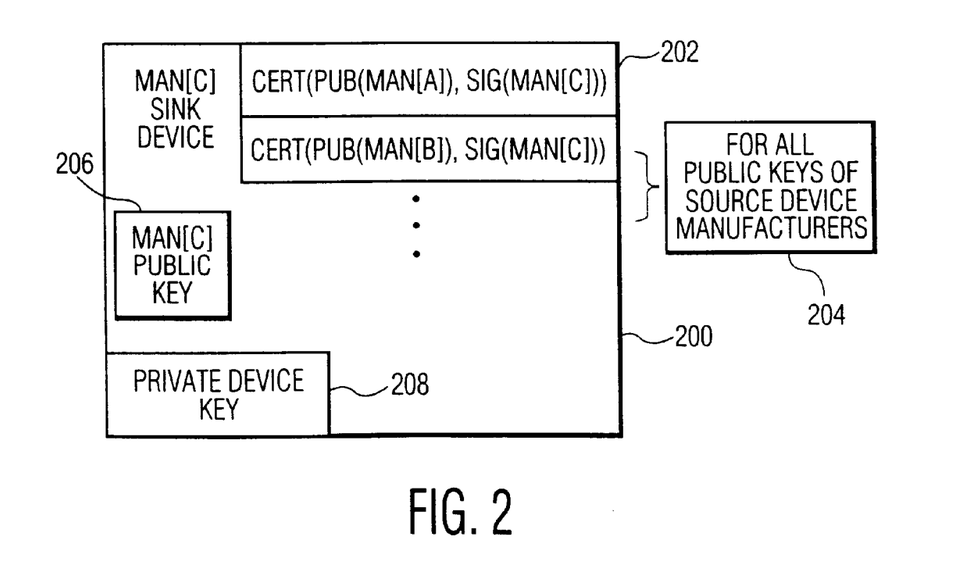
FIG. 2 is a block diagram of a sink device showing information stored thereon for copy protection in accordance with the present invention.

Referring to FIG. 2, a sink device 200 manufactured by C stores a number of certificates 202. The number of certificates 202 is equal to the number of source manufacturers 204 known at the time of the manufacture of sink device 200. Each stored certificate 202 is issued by the manufacturer of the sink, Sig(man[C]). The contents of each certificate 202 includes the public key of a different source manufacturer (manufacturers A and B), Pub(man[j]) where j is a designation of the source manufacturers (A and B). Thus, the list of certificates on a sink device 200 is of the form Cert(Pub(man[j]), Sig(man[C])) where Pub(man[j]) is different in each certificate 202. Sink device 200 includes a public key 206 for the sink manufacturer as well as an individual private key 208 as described above.

Figure 3:
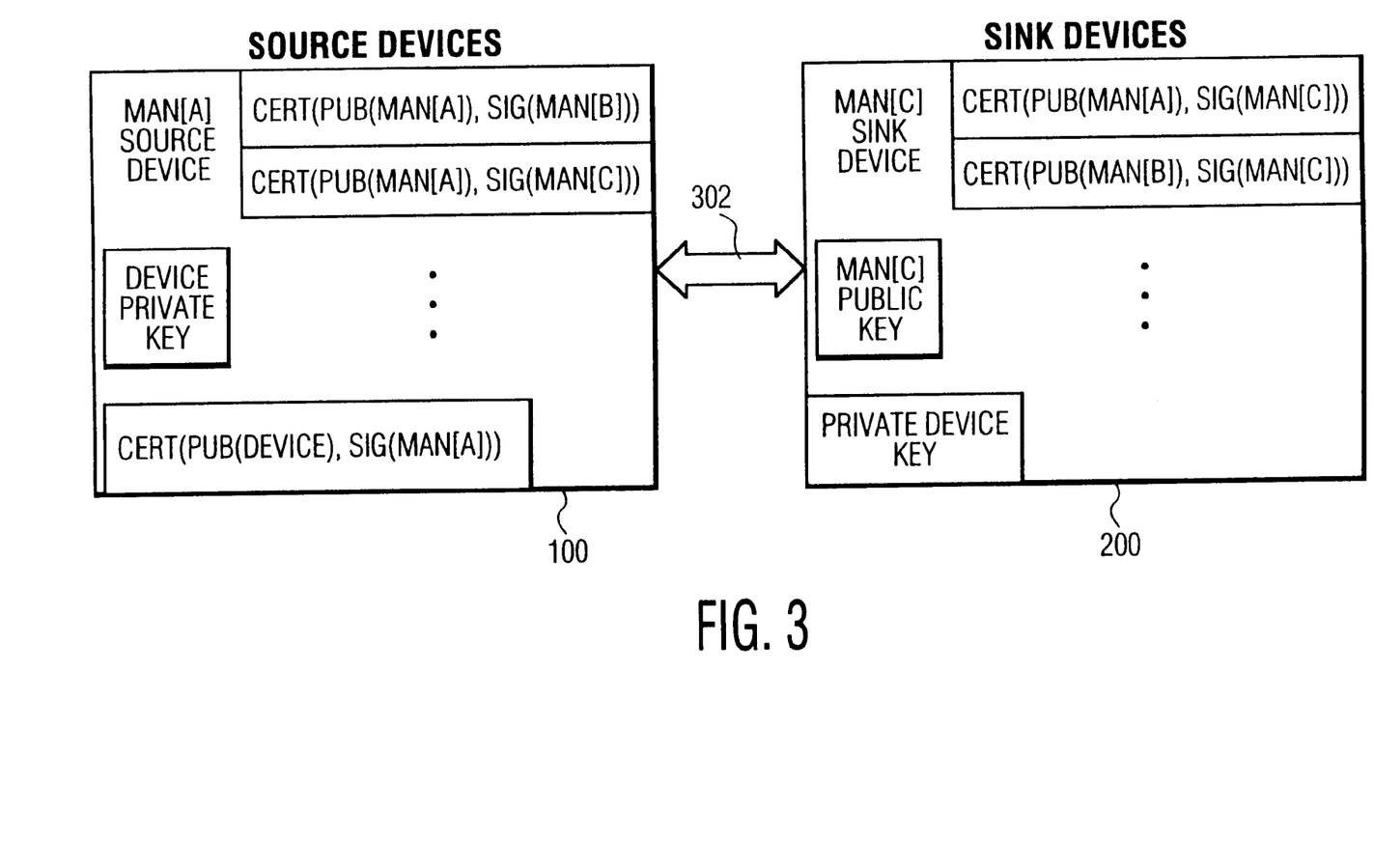
FIG. 3 is a block diagram of the source device of FIG. 1 and the sink device of FIG. 2 showing the devices connected by a bus in accordance with the present invention.

Referring to FIG. 3, when a source device 100 determines that the content can be placed on a bus 302, a protocol is performed with a sink device 200. The protocol makes available on sink device 200, a certificate including a public key of manufacturer of the source issued by the manufacturer of the sink, Cert(Pub(man[A]), Sig(man[C])), i.e., the missing link of the verification chain as described above.

Figure 4:
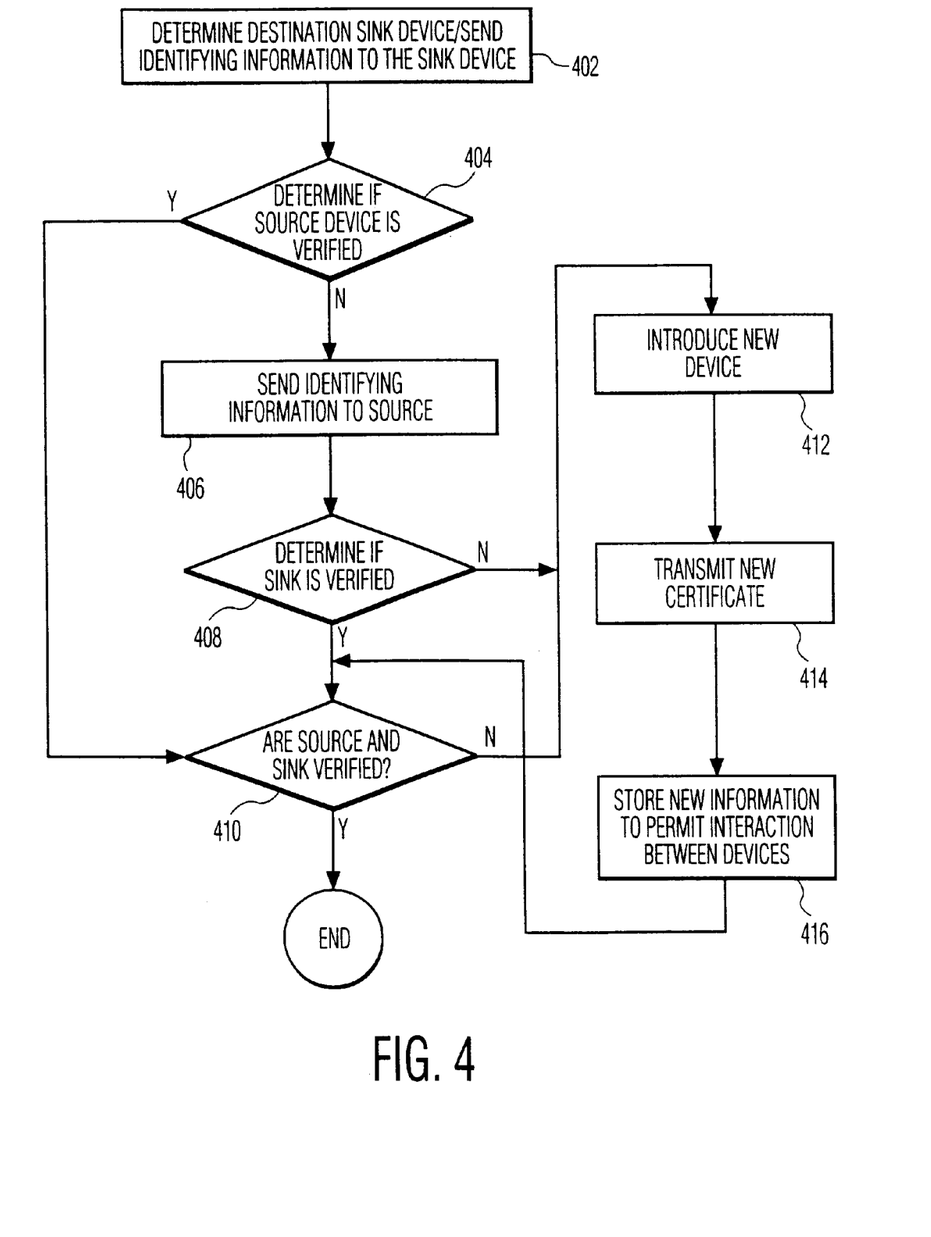
FIG. 4 is a flow diagram showing a protocol for interactions between a source device and a sink device in accordance with the present invention.

Referring to FIGS. 3 and 4, a protocol includes the following. In block 402, a source device 100 determines a destination sink device 200 and sends identifying information of the source manufacturer to sink device 200. In block 404, sink device 200 determines if there is a stored certificate including a public key of the manufacturer of source device 100 issued by the manufacturer of the sink device, i.e., Cert(Pub(man[source device]), Sig(man[sink device])). If the certificate exists then an acknowledgment is sent to sink device 200 and the path proceeds with step 410. In block 406, sink device 200 sends identifying information to the source device. In block 408, source device 100 determines if it has a certificate including a public key of the manufacturer of source device 100 issued by the manufacturer of sink device 200, i.e., Cert(Pub(man[source device]), Sig(man[sink device])). If the certificate exists, then source device 100 sends the certificate to sink device 200 and the path proceeds with block 410. Otherwise, fail and abort. In block 410, sink device 200 verifies the certificate including the public key of the manufacturer of source device 200, Cert(Pub(man[source device]), Sig(man[sink device])) using Pub(man[sink device]). If verification is successful then operations may continue. Otherwise, fail and abort protocol.

If the verifications fail, it may mean there has been tampering or an attempt has been made to fool the system. However, a failure may also mean that a new manufacturer has emerged or an existing manufacturer has changed its public key. In this case, an additional verification method is needed in accordance with the invention. The method may include using a unique private device key, e.g. key 110 of FIG. 1, or an external certificate to initiate adding a new certificate(s) and a public key associated with the invention. In block 412, a new source device or sink device is introduced. In block 414, the new device transmits a certificate including a public key associated with the new manufacturer. The certificate preferably includes a verification code from a third independent party verifying that the new public key is valid. Other methods and embodiments include predetermined codes or keys stored which if used or known to the new manufacturer may be used to pre-verify the new devices. In block 416, the new certificate including the new public key is stored on the other device thereby permitting interactions between the source and the sink devices. It is to be understood that either the source device, the sink device or both devices may be new and need to have new manufacturers certificates with public keys introduced. The means for adapting old devices to accept new devices may be performed by introducing new keys or certificates to old devices by broadcast transmission or a recording, such as a digital recording from a tape or other memory storage device. This adapting mechanism will depend on the devices and/or the implementation and may include communication and storage between devices.

Figure 5:
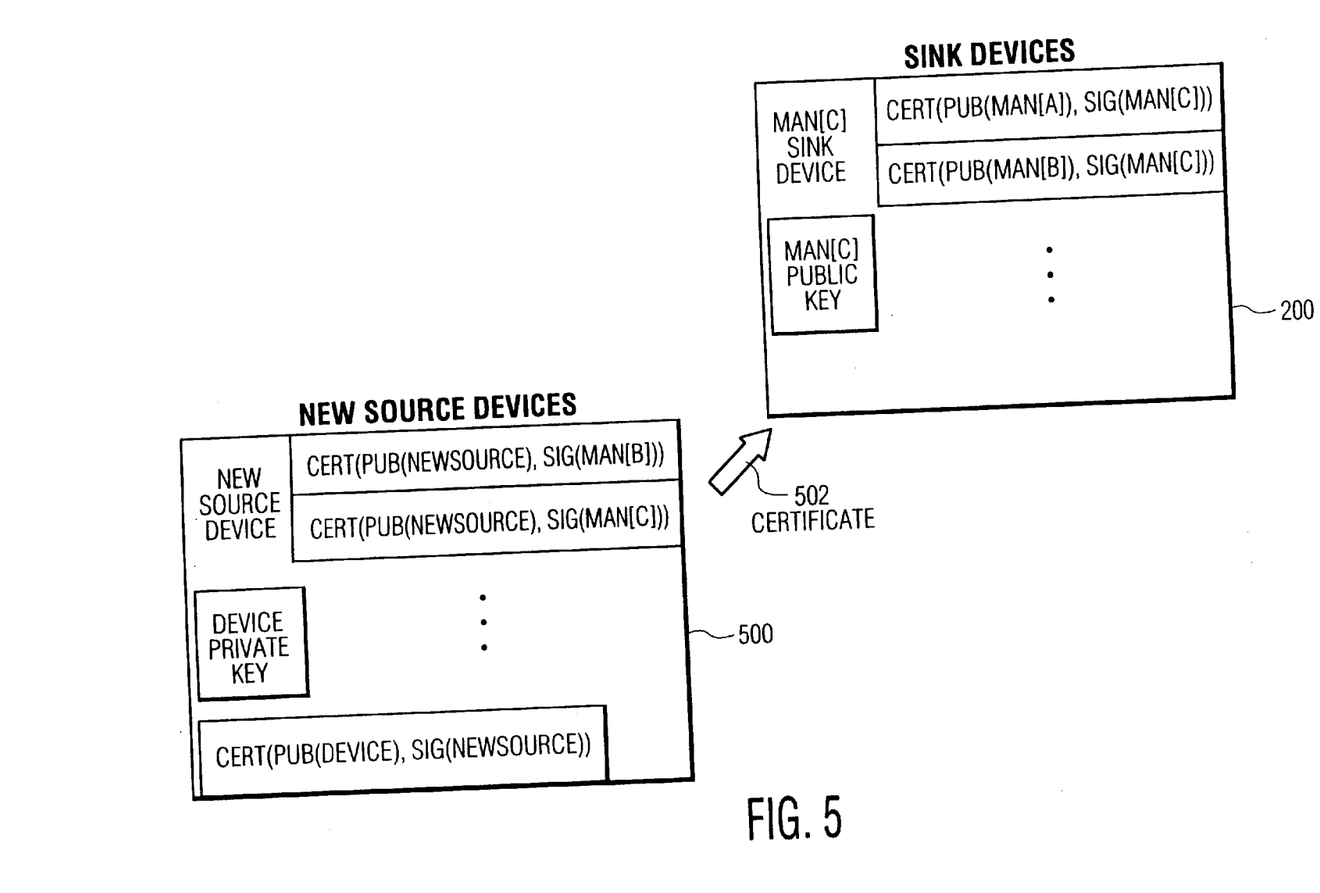
FIG. 5 is a block diagram showing a new source device added to the system of FIG. 3 in accordance with the present invention.

Referring to FIG. 5, when a new manufacturer produces a source device 500, the source device 500 will be able to provide a certificate 502, Cert(Pub(man(NewSource)), Sig (man[C])), to an existing sink device 200. Sink device 200 is thereby adapted to interface with source device 500, in accordance with the invention. A new public key is also provided for the new source manufacturer (NewSource), Cert(Pub(Device, Sig(NewSource)). Similarly, sink device 200 may provide a certificate to an existing source device and the source device may be adapted to interface with a new sink device (See FIG. 6).

Figure 6:
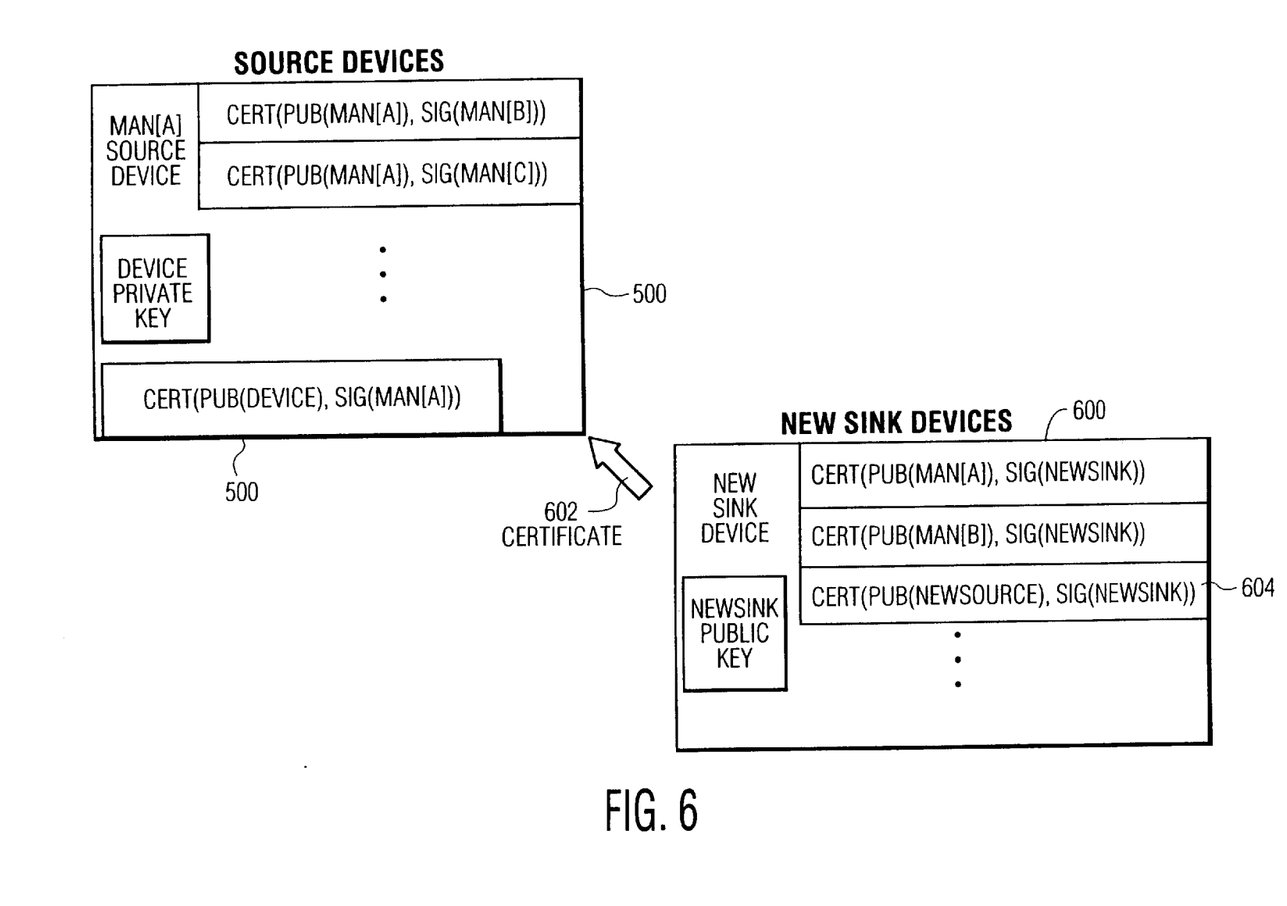
FIG. 6 is a block diagram showing a new sink device added to the system of FIG. 3 in accordance with the present invention.

Referring to FIG. 6, when a new manufacturer provides a sink device 600, the new sink device 600 will provide a certificate 602, Cert(Pub(man[A]), Sig(man(NewSink))) to source device 500 (manufactured by A). Source device 500 is thereby adapted to interface with sink device 600, in accordance with the invention. The new sink device 600 may include certificates for new sources introduced into the market as well. For example, a certificate 604 may be included on the new sink device 600. Certificate 604 includes a public key for a new source device (NewSource), Cert(Pub(NewSource), Sig(NewSink)). Note that a new manufacturer of a sink device (or source device) may employ an existing sink (source) manufacturers's information by storing the public key of the existing manufacturer and identifying itself as the existing sink (source) manufacturer.

Figure 7:
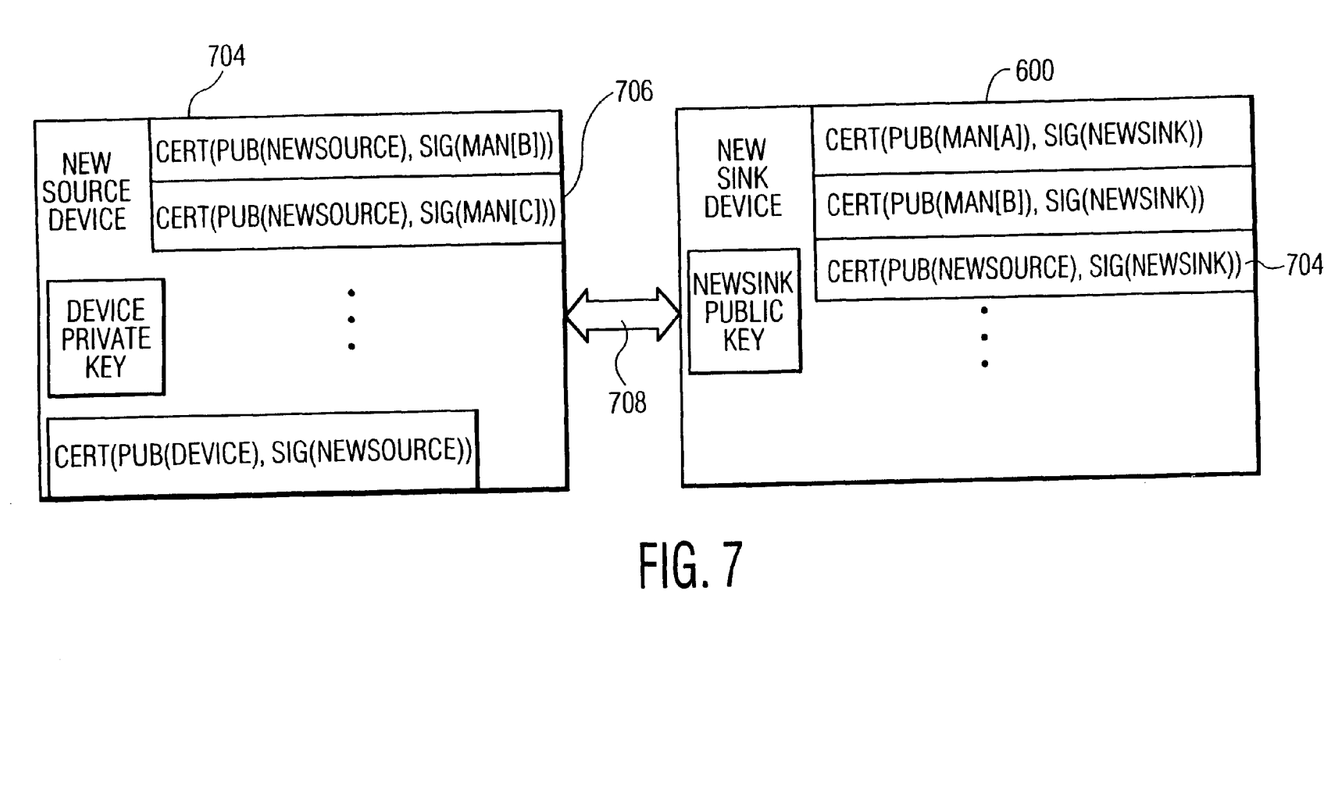
FIG. 7 is a block diagram showing a new sink device and a new source device added in accordance with the present invention.

Referring to FIG. 7, when a new manufacturer provides a new sink device 600, the new sink device 600 will provide a certificate 702, Cert(Pub(man[NewSource]), Sig(man (NewSink))), such that the new sink device 600 will be capable of interacting with a new source device 704. The source device 704 includes a public key of a new manufacturer, Pub(NewSource) included in a certificate 706. All missing information between the new source device and the new sink device may be provided to the other device to enable communications via a bus 708 therebetween in accordance with the invention.

Given each manufacturer complies and updates the list of certificates included in the manufacture of each new device. A protocol failure will almost never occur. Before an attacker could insert a certificate into the store of either the source or sink device which would verify correctly, the attacker would have to break the private key of a manufacturer.

Having described preferred embodiments for a novel method and system for consumer electronic device certificate management (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system for providing security between a source device and a sink device comprising:

a first device including a list of certificates, each certificate of the list including a signature configured for identifying manufacturers of second devices;

a second device configured for connecting to the first device, the second device including a list of certificates each certificate including a signature for identifying manufacturers of the first devices;

wherein the signatures each include a public key designated for each manufacturer; and at least one of the first device and the second device including means for adapting its respective certificate list to provide entry of a new signature configured for identifying a new manufacturer of one of the first device and the second device, wherein predetermined codes or keys are used by a new manufacturer to pre-verify a new device or chance an existing public key of a manufacturer.

2. The system as recited in claim 1, wherein the first device includes one of a pass-through device and a playback device.

3. The system as recited in claim 1, wherein the second device includes one of a record device and a presentation device.

4. The system as recited in claim 1, wherein the means for adapting includes means for transmitting and storing a new certificate between devices.

5. The system as recited in claim 1, wherein the first device and the second device are connected by a bus.

6. A system for providing copy protection between a source device and a sink device comprising:

a source device including a list of certificates, each certificate of the list configured for providing a signature for a manufacturer of sink devices, the signature configured for verifying sink devices;

a sink device configured for connecting to the source device, the sink device including a list of certificates corresponding to source device manufacturers, the sink device having a certificate omitted from the list of certificates of the source device;

wherein the signatures each include a public key designated for each manufacturer and means for adapting the source device to receive a new certificate from the sink device wherein the new certificate is transmitted to the source device to be added to the list of certificates thereby identifying the sink device to the source device, wherein predetermined codes or keys are used by a new manufacturer to pre-verify a new device or change an existing public key of a manufacturer.

7. The system as recited in claim 6, wherein the sink device includes a certificate list corresponding to manufactures of source devices and the source device has a certificate omitted from the list of certificates of the sink device, the sink device further comprising means for adapting the sink device to receive a new certificate wherein the new certificate is transmitted to the sink device to be added to the list of certificates thereby identifying the source device to the sink device.

8. The system as recited in claim 6, wherein the source device includes one of a pass-through device and a playback device.

9. The system as recited in claim 6, wherein the sink device includes one of a record device and a presentation device.

10. The system as recited in claim 6, wherein the first device and the second device are connected by a bus.

11. A system for providing copy protection between a source device and a sink device comprising:

a sink device including a list of certificates, each certificate of the list configured for providing a signature for a manufacturer of source devices, the signature configured for verifying source devices;

a source device configured for connecting to the sink device, the source device including a list of certificates corresponding to sink device manufacturers, the source device having a certificate omitted from the list of certificates of the sink device;

wherein the signatures each include a public key designated for each manufacturer; and means for adapting the sink device to receive a new certificate from the source device wherein the new certificate is transmitted to the sink device to be added to the list of certificates thereby identifying the source device to the sink device, wherein predetermined codes or keys are used by a new manufacturer to pre-verify a new device or change an existing public key of a manufacturer.

12. The system as recited in claim 11, wherein the source device includes a certificate list corresponding to manufactures of sink devices and the sink device has a certificate omitted from the list of certificates of the source device, the source device further comprising means for adapting the source device to receive a new certificate wherein the new certificate is transmitted to the source device to be added to the list of certificates thereby identifying the sink device to the source device.

13. The system as recited in claim 11, wherein the source device includes one of a pass-through device and a playback device.

14. The system as recited in claim 11, wherein the sink device includes one of a record device and a presentation device.

15. The system as recited in claim 11, wherein the signatures each include a public key designated for each manufacturer.

16. The system as recited in claim 11, wherein the sink device and the source device are connected by a bus.

17. A method for copy protecting content transferred between a source device and a sink device comprising the steps of:

transmitting identifying information between the source device and the sink device, wherein the identifying information and the new identifying information includes public keys corresponding to manufacturers of the source devices and the sink devices;

verifying the source device and the sink device by determining if the source device and the sink device include the identifying information transmitted from the other of the source device and the sink device;

if the step of verifying fails, checking new identifying information against certification information in which the certification information is provided for one of a new source device and a new sink device including new identifying information; and transmitting and storing the new identifying information between the source device and the sink device using predetermined codes or keys are used by a new manufacturer to pre-verify a new device or change an existing public key of a manufacturer to provide a new certificate for enabling data exchanges between the source device and the sink device.

18. The method as recited in claim 17, wherein the step of transmitting and storing the new identifying information includes verifying the new identifying information with a predetermined certification source.

19. The method as recited in claim 18, wherein the predetermined certification source includes a private key.

* * * * *